Patented Nov. 17, 1925.

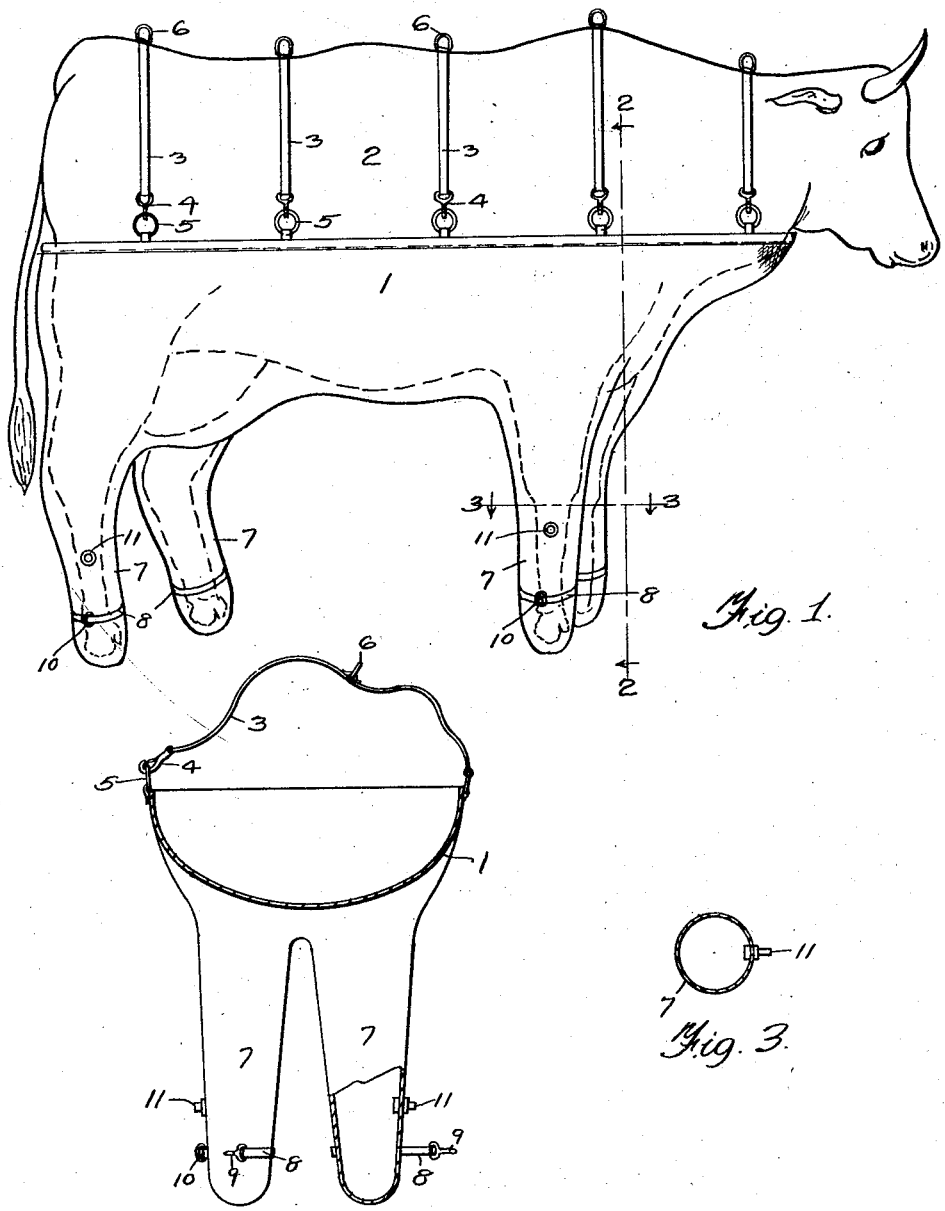

1,562,318

UNITED STATES PATENT OFFICE.

VICTOR E. ERLANDSON, OF OSAKIS, MINNESOTA.

STOCK-DISINFECTING COVER.

Application filed November 2, 1923. Serial No. 672,425.

*To all whom it may concern:*

Be it known that VICTOR E. ERLANDSON, a citizen of the United States of America, residing at Osakis, in the county of Douglas and State of Minnesota, has invented new and useful Improvements in Stock-Disinfecting Covers, of which the following is a specification.

The object of the invention is to provide means for the application to live stock whereby treatment of the same with a disinfecting solution may be readily, quickly and effectively carried out.

To this end the invention consists in a certain construction and combination of parts of which a preferred embodiment is shown but which does not define the limits of the invention.

Figure 1 is a side elevational view showing the practical application of the invention.

Figure 2 is a section on the line 2—2 of Figure 1.

Figure 3 is a section on the line 3—3 of Figure 1.

The invention comprises a covering for the under half of the body portion of an animal and the legs thereof, the body portion 1 of the cover completely enclosing the belly, the rump, and the breast of the animal indicated at 2, this body portion being secured to the animal by back straps 3 terminally secured along the marginal edge at uniformly spaced points and provided with snap fasteners 4 engageable with rings or eyes 5 at the opposite side edge. Straps 3 may be trained through the eyes 4 and the fasteners 5 engaged with eyes 6 carried by the intermediate portions of the strap. By this means of adjustment the body portion may be raised or lowered on the animal to which it is attached. Connected with the body portion 1 are the leg members 7 which are closed at their lower ends but which, just above the lower extremities, are provided with straps 8 secured at one end of the leg portion and provided with terminal fasteners 9 engageable with complemental fasteners 10 carried on the leg members. By this means the leg members may be gathered around the legs at the fetlocks to enable the animal under treatment to walk more freely than if the cover around the legs was permitted to remain loose.

The treatment consists in the application by hand of the treating solution to the back and head of the animal after which the straps on the body portion and leg members are loosened when the solution is applied freely and allowed to run to the lower portions of the body and on to the legs until it reaches all parts of the body and legs. Thereafter all surplus solution is drained off through the drain 11 mounted in the leg members, the dropping below the legs being ejected by compression of the leg members with the hand to raise this surplus solution to the level of the drains. Then the leg members are tightened at the fetlock joint by means of the strap and the body portion elevated into tight contact with the body, the covering thus preventing the solution from dropping off and keeping it in contact with the body of the animal for a stipulated length of time when the suit may be removed by detaching the several straps.

Having described the invention, what is claimed as new and useful is:—

1. An applicator for applying a disinfectant to animals, comprising a body having a trough-shaped portion and depending leg portions which are closed at their lower ends, means for supporting the trough-shaped portion upon the body of an animal, and valve controlled outlet openings provided upon the leg portions and spaced above the lower ends thereof.

2. An applicator for applying a disinfectant to animals, comprising a body having a trough-shaped portion and depending leg portions which are closed at their lower ends, means for supporting the trough-shaped portion upon the body of an animal, valve controlled outlet openings provided upon the leg portions and spaced above the lower ends thereof, and means located between said openings and the lower ends of the leg portions for contracting the leg portions around the legs of the animal.

In testimony whereof he affixes his signature.

VICTOR E. ERLANDSON.